W. D. KENDRICK.
ANGLE COCK.
APPLICATION FILED MAY 11, 1909.
943,554.
Patented Dec. 14, 1909.
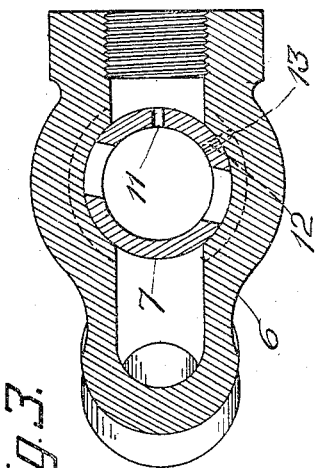
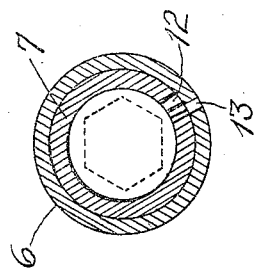
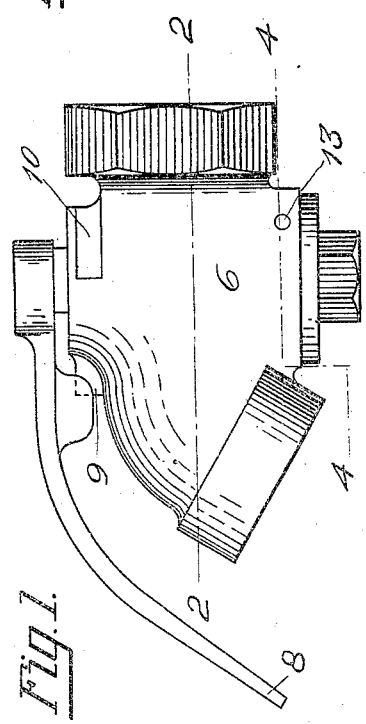
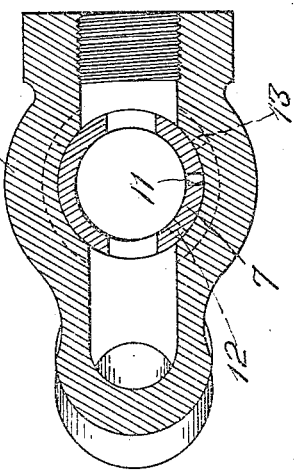
Inventor
William D. Kendrick
By Milo B. Stevens &c.
Attorneys
Witnesses
Arthur E. Wesley
A. R. Walton

UNITED STATES PATENT OFFICE.

WILLIAM DECALB KENDRICK, OF GLOBE, ARIZONA TERRITORY.

ANGLE-COCK.

943,554.

Specification of Letters Patent. Patented Dec. 14, 1909.

Application filed May 11, 1909. Serial No. 495,257.

*To all whom it may concern:*

Be it known that I, WILLIAM D. KENDRICK, a citizen of the United States, residing at Globe, in the county of Gila and Territory of Arizona, have invented certain new and useful Improvements in Angle-Cocks, of which the following is a specification.

This invention relates to angle cocks or valves used especially on air brake systems.

Angle cocks have heretofore been made provided with means for bleeding the hose when the cock is closed, for the purpose of exhausting the air pressure in a detached car or the like. It is sometimes desirable to retain the pressure in the hose when the train line is cut off.

The object of my invention is to provide a simple and novel device by means of which the air can be either retained in the hose or released, by appropriate movement of the handle of the angle cock.

The invention has a further object that it provides means for allowing the escape of moisture or water from the train line, permitting it to be either blown out or to run out without pressure.

The invention is illustrated in the accompanying drawings, in which—

Figure 1 is a side elevation of the cock. Fig. 2 is a horizontal section on the line 2—2 with the cock in open position, as shown in Fig. 1. Fig. 3 is a section on the same line with the cock in the lapped or bleeding position. Fig. 4 is a section on the line 4—4 with the cock completely closed.

The casing of the cock is indicated at 6 and the plug at 7, provided with a main port and the usual handle 8, which stops against the shoulder 9 when in open position and against the shoulder 10 when in closed position. In the hose side of the plug I drill a small hole 11 which is covered when the cock is open, but which is uncovered when the cock is closed. In the other side of the plug, I provide a small hole 12 in line with a hole 13 drilled in the casing. These holes are at the bottom of the plug, which is hollow, as usual, and they are in the same horizontal plane and so located that they register with each other just before the plug reaches the fully closed position, as shown in Fig. 3, but they do not register when the cock is fully closed, as shown in Fig. 4.

In the operation of the device the ports 11, 12 and 13 are closed when the cock is open. To bleed the hose the plug is turned until the port 11 opens to the pipe and the ports 12 and 13 register with each other. This allows the pressure in the hose or car to exhaust through the ports 11, 12 and 13, the angle cock being at the same time closed, since the ports are arranged to register after the plug laps or covers the passage therethrough. If, however, it be desired to retain the air in the hose, the plug is turned to completely closed position which carries the port 12 beyond the port 13, and so prevents any escape of the air beyond the cock. The ports 12 and 13 are advantageously located at the bottom of the cock so that any water or moisture which collects therein will be blown out or flow out therethrough. Standard angle cocks may be readily provided with the invention by drilling the holes indicated, which can be done at a trifling cost. By bleeding the valve the air brakes can be applied at any desired point on the train, without parting the hose, which is often of decided advantage.

The uses to which my invention may be put, are necessarily varied, but to my mind, the most important ones are those in connection with railways. For instance, it may be used in steam hose connections between cars, to take the steam out preparatory to parting the hose, which latter operation, by the present method, is very dangerous. Also, it may be used with air pipes of the brake systems, and located on railway freight cars, so as to enable the conductor and trainmen, besides the engineer, to set the brakes by releasing the air. In the latter use, somewhat larger ports than the relative sizes shown, would be necessary.

Having fully described my invention, I claim:

1. A cock comprising a casing with a port therein, and a turning plug in the casing provided, in addition to its main port, with a port which opens to the main passage in the casing on one side when the plug is turned toward closed position, and another port which registers with the port in the casing when the plug is so turned, the latter ports being closed when the plug is turned to fully closed position.

2. An angle cock comprising a casing and a hollow turning plug therein having communicating passages, said plug having a port through its wall to communicate with said casing passage when said plug has been turned to register the same, and said plug and said casing having ports through their walls, adjacent the bottom of the former, which register after the registration of said first named plug port with said casing passage said last named ports being closed when the plug is turned to fully closed position.

In testimony whereof I affix my signature, in presence of two witnesses.

WILLIAM DECALB KENDRICK.

Witnesses:
R. W. STURGIS,
W. F. RAWLINGS.